(12) United States Patent
Sherif et al.

(10) Patent No.: US 10,619,230 B2
(45) Date of Patent: Apr. 14, 2020

(54) NEAR-EUTECTOID BEARING STEEL

(71) Applicant: Aktiebolaget SKF, Gothenburg (SE)

(72) Inventors: Mohamed Sherif, Hilversum (NL);
Urszula Alicja Sachadel-Solarek, Utrecht (NL); Leif Viskari, Frillesas (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/861,077

(22) Filed: Jan. 3, 2018

(65) Prior Publication Data

US 2018/0202030 A1    Jul. 19, 2018

(30) Foreign Application Priority Data

Jan. 16, 2017    (GB) .................................. 1700694.1

(51) Int. Cl.

| | |
|---|---|
| *C22C 38/48* | (2006.01) |
| *C22C 38/44* | (2006.01) |
| *C22C 38/02* | (2006.01) |
| *C22C 38/04* | (2006.01) |
| *C22C 38/42* | (2006.01) |
| *C22C 38/50* | (2006.01) |
| *C22C 38/00* | (2006.01) |
| *C22C 38/52* | (2006.01) |
| *C22C 38/46* | (2006.01) |
| *F16C 33/30* | (2006.01) |
| *F16C 33/62* | (2006.01) |
| *F16C 33/64* | (2006.01) |

(52) U.S. Cl.
CPC .............. *C22C 38/44* (2013.01); *C22C 38/00* (2013.01); *C22C 38/001* (2013.01); *C22C 38/02* (2013.01); *C22C 38/04* (2013.01); *C22C 38/42* (2013.01); *C22C 38/46* (2013.01); *C22C 38/48* (2013.01); *C22C 38/50* (2013.01); *C22C 38/52* (2013.01); *F16C 33/30* (2013.01); *F16C 33/62* (2013.01); *F16C 33/64* (2013.01); *F16C 2204/64* (2013.01); *F16C 2204/66* (2013.01); *F16C 2204/72* (2013.01)

(58) Field of Classification Search
CPC ......... C22C 38/44; C22C 38/46; C22C 38/52; C22C 38/50; C22C 38/00; C22C 38/48; C22C 38/42; C22C 38/04; C22C 38/02; C22C 38/001; F16C 33/32; F16C 33/34; F16C 33/62; F16C 2204/72; F16C 2204/66; F16C 2204/64
USPC .......................................................... 420/91
See application file for complete search history.

(56) References Cited

U.S. PATENT DOCUMENTS

| | | |
|---|---|---|
| 2005/0053512 A1 | 3/2005 | Laczko |
| 2013/0224065 A1 | 8/2013 | Hirai et al. |

FOREIGN PATENT DOCUMENTS

| | | | |
|---|---|---|---|
| EP | 2647733 A1 | | 10/2013 |
| JP | H11335773 A | | 12/1999 |
| JP | 2006169624 A | * | 6/2006 |
| WO | 2014049032 A1 | | 4/2014 |

OTHER PUBLICATIONS

Machine translation of Patent JP2006169624 (Year: 2006).*
Machine translation of Patent JPH11335773 (Year: 1999).*
Mohamed Y. Sherif, et al: "Novel Tough Micro-Alloyed Bearing Steel with High Hardenability"; Bearing Steeltechnologies: 11th Volume; 2017; pp. 296-322.

* cited by examiner

*Primary Examiner* — Haytham Soliman
(74) *Attorney, Agent, or Firm* — Garcia-Zamor Intellectual Property Law, LLC; Ruy Garcia-Zamor; Bryan Peckjian

(57) ABSTRACT

A near-eutectoid bearing steel having from 0.7 to 0.9 wt. % carbon, from 0.1 to 0.35 wt. % silicon, from 0.7 to 1.2 wt. % manganese, from 1.0 to 2.0 wt. % chromium, from 0.1 to 0.35 wt. % molybdenum, from 0.2 to 0.6 wt. % nickel, from 0.4 to 1.2 wt. % copper, from 0 to 0.15 wt. % vanadium, from 0 to 0.15 wt. % niobium, from 0 to 0.15 wt. % tantalum, from 0 to 0.2 wt. % cobalt, from 0 to 0.1 wt. % aluminum, from 0 to 0.05 wt. % phosphorous, from 0 to 0.03 wt. % sulphur, from 0 to 0.075 wt. % tin, from 0 to 0.075 wt. % antimony, from 0 to 0.04 wt. % arsenic, from 0 to 0.01 wt. % lead, up to 350 ppm nitrogen, up to 100 ppm oxygen, up to 50 ppm calcium, up to 50 ppm boron, up to 50 ppm titanium, the balance iron, together with any other unavoidable impurities.

12 Claims, No Drawings

NEAR-EUTECTOID BEARING STEEL

CROSS-REFERENCE

This application claims priority to British patent application no. 1700694.1 filed on Jan. 16, 2017, the contents of which are fully incorporated herein by reference.

TECHNOLOGICAL FIELD

The present invention relates generally to the field of metallurgy and to a bearing steel composition for hardened bearing components, whereby the carbon content is approximately equal to that at the eutectoid point.

BACKGROUND

Bearings are devices that permit constrained relative motion between two parts. Rolling element bearings comprise inner and outer rings and a plurality of rolling elements (balls or rollers) disposed therebetween. For long-term reliability and performance, it is important that the various elements have resistance to rolling contact fatigue.

For large-size bearings, where the rings have a relatively large wall-thickness, an important characteristic of bearing steels is hardenability, i.e. the depth up to which the alloy is hardened after a heat-treatment process. One example of a bearing steel that is commonly used to make the rings of large-size bearings is DIN 1.3536 (100 CrMo7-3(W5)). A further example of a bearing steel with excellent hardenability is disclosed in WO2014049032.

A common application for large-sized bearings is in wind turbines, e.g. the main shaft bearings. These bearings are often required to operate under high loads and in extreme environmental conditions. Corrosion resistance is then another important characteristic of the bearing steel from which the rings are made. Under high fatigue loading, it is also important that the material has a high tolerance to defects in the microstructure, such as non-metallic inclusions and micro-cracks, to resist crack propagation and fracture. In other words, toughness is yet another important attribute.

In some applications, the component may require resistance against the combined effects of both stress—whether residual and/or externally exerted—and corrosion, i.e. stress corrosion cracking (SCC) resistance.

There is still room for improvement in terms of defining a steel alloy which combines excellent hardenability with excellent toughness and corrosion resistance.

SUMMARY

The invention resides in a steel alloy having:
from 0.7 to 0.9 wt. % carbon,
from 0.1 to 0.35 wt. % silicon,
from 0.7 to 1.2 wt. % manganese,
from 1.0 to 2.0 wt. % chromium,
from 0.1 to 0.35 wt. % molybdenum,
from 0.2 to 0.6 wt. % nickel,
from 0.4 to 1.2 wt. % copper,
from 0 to 0.15 wt. % vanadium,
from 0 to 0.15 wt. % niobium,
from 0 to 0.15 wt. % tantalum,
from 0 to 0.2 wt. % cobalt,
from 0 to 0.1 wt. % aluminum,
from 0 to 0.05 wt. % phosphorous,
from 0 to 0.03 wt. % sulphur,
from 0 to 0.075 wt. % tin,
from 0 to 0.075 wt. % antimony,
from 0 to 0.04 wt. % arsenic,
from 0 to 0.01 wt. % lead,
up to 350 ppm nitrogen,
up to 100 ppm oxygen,
up to 50 ppm calcium,
up to 50 ppm boron,
up to 50 ppm titanium,
the balance iron, together with any other unavoidable impurities.

DETAILED DESCRIPTION

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In the present invention, the steel alloy comprises from 0.7 to 0.9 wt. % carbon, preferably from 0.75 to 0.85 wt. % carbon. In combination with the other alloying elements, this results in a desired microstructure. The relatively low carbon content of a near-eutectoid bearing steel is beneficial for toughness, but the relatively lower concentration of carbon may raise the martensite start temperature (MS) such that fine bainite (bainitic-ferrite) becomes difficult to obtain. To circumvent this potential issue, some embodiments of the composition are designed to allow the use of relatively high austenitisation temperatures without excessive austenite grain growth, by means of micro-alloying with vanadium, for example.

Furthermore, the relatively low carbon content makes the steel particularly suitable for continuous casting, although other processing routes such as ingot casting may also be applied. In any case, the austenite carbon content during austenitisation is limited to a maximum of 0.7 wt. %, preferably no more than 0.6 wt. %, more preferably at about 0.55 wt. %. Additionally, the alloy is designed such that little or no cementite is left undissolved after austenitisation.

The steel alloy comprises from 1.0 to 2.0 wt. % chromium, preferably from 1.2 to 1.8 wt. % chromium.

The steel alloy comprises from 0.1 to 0.35 wt. % molybdenum, preferably from 0.15 to 0.35 wt. % molybdenum. Molybdenum may act to avoid grain boundary embrittlement and increases hardenability. Molybdenum also increases the tempering resistance of the steel's microstructure but is an expensive alloying element. Given the relatively high contents of copper and nickel in the present invention, the alloy content of molybdenum may be kept relatively low.

The steel alloy comprises from 0.1 to 0.35 wt. % silicon, preferably from 0.15 to 0.3 wt. % silicon. In combination with the other alloying elements, this results in the desired microstructure with a minimum amount of retained austenite. Silicon helps to suppress the precipitation of cementite and carbide formation. However, steels with high silicon content tend to retain more austenite in their hardened structures due to the carbide-suppressing characteristics of the element. It follows that the steel concentration of silicon can be reduced to lower the retained austenite content. In an embodiment, the steel alloy comprises from 0.15 to 0.2 wt. % silicon.

The steel alloy composition comprises from 0.7 to 1.2 wt. % manganese, preferably from 0.7 to 1.0 wt. % manganese. Manganese acts to increase the stability of austenite relative to ferrite. Manganese may also act to improve hardenability.

The steel alloy composition comprises from 0.2 to 0.6 wt. % nickel, preferably from 0.25 to 0.5 wt. % nickel.

The steel alloy composition comprises from 0.4 to 1.2 wt. % copper, preferably from 0.5 to 1.0 wt. % copper.

Copper and nickel are both austenite stabilisers and also improve hardenability. Furthermore, the addition of nickel may improve the corrosion resistance of the bearing steel microstructure, but is added mainly to prevent hot-shortness during hot working of the steel. The presence of copper is thought to be beneficial when a component made from the inventive steel, e.g. a rolling element bearing, operates in a corrosive environment. The lubricant used in the bearing may comprise sulphur-containing additives or the steel may comprise non-metallic inclusions such as manganese sulphide (MnS). Thus, if copper ions are dissolved in the lubricant/corrosive medium, they may inhibit the detrimental effect of dissolved sulphur species on corrosion pit initiation via the formation of insoluble copper sulphides.

Preferably, the steel alloy contains copper and nickel in a ratio of about 2:1, to improve hot workability.

The addition of both copper and nickel was also found to be highly effective in reducing the MS temperature.

The martensite start temperature tends to decrease with increasing carbon content. In embodiments of the steel alloy where the carbon content is towards the lower range, i.e. 0.7 to 0.8 wt. %, it may be necessary to austenitise at a relatively high temperature of e.g. 900° C. and soak at temperature for relatively longer, to ensure that more carbon is available in solid solution. Excessive growth of the of the prior austenite grains is then a risk.

Thus, in some embodiments, micro-alloying elements are added to prevent any possible excessive grain growth during hardening. The micro-alloying elements are selected from one or more of vanadium, niobium and tantalum, and are present in a total amount of between 0.08 and 0.15 wt. %, preferably between 0.08 and 0.12 wt. %.

Alloying with vanadium, for example, enables the formation of V-rich precipitates, which then pin the prior austenite grains during austenitisation. The size range of such precipitates is up to 50 nm. Furthermore, the micro-alloying additions improve the strength and hardness of the hardened steel, resulting in better resistance to rolling contact fatigue.

In a one example, the alloy composition contains vanadium, niobium and tantalum. The deliberate dissolution of niobium and tantalum in the vanadium-rich precipitates is advantageous, in that it renders them more stable.

In some embodiments, nitrogen is added such that the steel alloy comprises from 50 to 350 ppm nitrogen, preferably between 100 and 350 ppm nitrogen. In other embodiments, there is no deliberate addition of nitrogen. Nevertheless, the alloy may necessarily still comprise at least 50 ppm nitrogen due to exposure to the atmosphere.

In examples of the steel alloy which comprise vanadium and added nitrogen, the formation of vanadium- and nitrogen-rich precipitates is favored over the formation of vanadium carbides since the former is more stable thermodynamically. For a given fraction of vanadium carbides and vanadium nitrides, the vanadium nitrides tend to be smaller, more stable and as such more effective in pinning prior austenite grain boundaries. Vanadium- and nitrogen-rich precipitates also contribute more to the strengthening of the bearing steel structure.

Preferably, the steel alloy comprises no more than 0.1 wt. % aluminum. More preferably, the steel is free of aluminum. The presence of aluminum is undesirable, as nitrogen can be lost due to the formation of aluminum nitrides. When the presence of a small amount of aluminum is unavoidable, however, the alloy suitably comprises aluminum and nitrogen in a weight ratio of $0.014 \leq Al/N \leq 0.6$, preferably $0.014 \leq Al/N \leq 0.1$. This ratio ensures that not all of the nitrogen is bound to aluminum, leaving some available for e.g. the V-rich precipitates, thereby refining and stabilizing them.

As noted, the steel composition may also optionally include one or more of the following elements:
from 0 to 0.15 wt. % vanadium (for example 0.08 to 0.15 wt. % vanadium),
from 0 to 0.15 wt. % niobium (for example 0.05 to 0.1 wt. % niobium),
from 0 to 0.15 wt. % tantalum (for example 0.05 to 0.1 wt. % tantalum),
from 0 to 0.2 wt. % cobalt (for example 0.05 to 0.2 wt. % cobalt),
from 0 to 0.1 wt. % aluminum (for example 0.03 to 0.05 wt. % aluminum),
from 0 to 0.035 wt. % nitrogen (for example 50 to 350 ppm nitrogen).

It will be appreciated that the steel alloy referred to herein may contain unavoidable impurities, although, in total, these are unlikely to exceed 0.3 wt. % of the composition. Preferably, the alloys contain unavoidable impurities in an amount of not more than 0.1 wt. % of the composition, more preferably not more than 0.05 wt. % of the composition. In particular, the steel composition may also include one or more impurity elements. A non-exhaustive list of impurities includes, for example:
from 0 to 0.05 wt. % phosphorous
from 0 to 0.03 wt. % sulphur
from 0 to 0.04 wt. % arsenic
from 0 to 0.075 wt. % tin
from 0 to 0.075 wt. % antimony
from 0 to 0.01 wt. % lead
from 0 to 0.005 wt. % boron
up to 350 ppm nitrogen,
up to 100 ppm oxygen,
up to 50 ppm calcium,
up to 50 ppm boron,
up to 50 ppm titanium The steel alloy composition may consist essentially of the recited elements. It will therefore be appreciated that in addition to those elements that are mandatory other non-specified elements may be present in the composition provided that the essential characteristics of the composition are not materially affected by their presence.

The steel alloys according to the present invention preferably have a microstructure comprising (i) martensite (typically tempered martensite) and/or bainitic ferrite, (ii) carbides and/or carbonitrides, and (iii) optionally some retained austenite. A low level of retained austenite is advantageous in that it improves dimensional stability of a bearing component. The microstructure may further comprise nitrides.

The structure of the steel alloys may be determined by conventional microstructural characterization techniques such as, for example, optical microscopy, TEM, SEM, AP-FIM, and X-ray diffraction, including combinations of two or more of these techniques.

The hardened steel alloy will typically exhibit high hardness and/or dimensional stability. This means that the steel alloy can usefully find application in the manufacture of, for example, a component of a rolling element bearing. The steel alloy is typically a bearing steel alloy. The steel alloy may also be used to make shafts, gears, engine components, wheel end components and linear motion products such as ball and roller screws.

According to another aspect of the present invention, there is provided a bearing component comprising a steel alloy as herein described. Examples of bearing components where the steel can be used include a rolling element (e.g. balls or cylindrical, tapered, toroidal or spherical rollers), an inner ring, and an outer ring. The present invention also provides a bearing comprising a bearing component as herein described.

The present invention will now be described further with reference to suitable heat treatments for the steel alloy, provided by way of example.

The steel alloys according to the present invention are typically subjected to a conventional spheroidising-annealing process prior to hardening. A conventional normalizing heat treatment process may also be applied prior to spheroidising-annealing.

Hardening will usually require at least the partial austenitisation of the microstructure. This may be achieved, for example, by holding the bearing components within the temperature range 850 to 895° C., preferably for durations of from 15 to 120 minutes. Typical prior austenite grain size is less than 20 μm. Some carbides remain undissolved during austenitisation. Such carbides are, for example, M3C (iron-rich) and M7C3 (chromium-rich). Typical carbide size in this case is up to 3 μm, preferably around 1 μm.

Afterwards, the bearing components are typically quenched into a suitable medium, for example, oil (usually used for martensite hardening), or into a salt bath, if bainite transformation is required.

If a martensitic microstructure is required, typically the components are quenched below the MS temperature. However, in some cases, especially when processing larger bearing components with thicker wall sections, the components may be equilibrated at temperatures just above the MS temperature for sufficient duration, prior to subsequent quenching, to obtain the desired microstructure. In any case, the as-quenched, untempered martensite will usually be followed by a tempering step.

Martensitic hardening may be achieved via through hardening or surface induction hardening, for example. In such a case, the material would preferably be tough-tempered prior to hardening.

Bainite hardening usually comprises the quenching of the austenitised bearing components down to temperatures just above the MS temperature of the austenite matrix. The components may then be held isothermally at temperature for a period ranging from 10 minutes up to 24 hours per stage. The bainite hardening (transformation) process may comprise, for example, one, two or three transformation stages, all carried out at different temperatures. A typical temperature range for a transformation stage is 175 to 270° C. The objective is to optimise the hardness and the overall transformation time. After bainite transformation has ceased, the components are typically cooled to room temperature.

Optionally, the austenitised bearing components may be hardened such that a mixed martensitic-bainitic microstructure is obtained.

Additionally, freezing treatments may be applied on the bearing components, which is typically followed by tempering. Such treatments are beneficial in terms of minimizing the retained austenite in the final bearing component, to provide maximum dimensional stability.

Preferably, the hardened bearing components are free or substantially free from retained austenite.

Optionally, the steel alloy or bearing component may be subjected to surface modifications whether thermo-chemical, mechanical, or both. Such processes may be applied to increase the performance of the bearing component. Examples of such processes include carbonitriding and burnishing.

The invention will now be described further with reference to the following non-limiting examples.

Examples

A steel with the following target chemical composition was used in the present work: (wt. %) 0.8C-1.7Cr-0.8Mn-0.6Cu-0.3Ni-0.3Si-0.27Mo-0.1V (Steel A). Chemical analysis of a sample made from Steel A revealed the presence of further elements: (wt. %) 0.003P-0.001S-0.024Al-0.001Ti-0.002O. The balance is made of iron together with any unavoidable impurities. Steel A is suitable for use in the production of large-size bearing rings and has high hardenability. The expected Ideal Critical Diameter for the composition is 124.1 mm (see C. F. Jatczak: Hardenability in high carbon steels. Metallurgical Transactions Volume 4:2267-2277, 1973).

As a reference, a known steel with an equivalent level of carbon was used, having the following composition: (wt. %) 0.8C-1.7Cr-0.8Mn-0.2Cu-0.1Ni-0.3Si-0.25Mo-0.1V (Steel B). Chemical analysis of a sample made from Steel B revealed the presence of further elements: (wt. %) 0.003P-0.001S-0.029Al-0.001Ti-0.002O. The balance is made of iron together with any unavoidable impurities. The expected Ideal Critical Diameter for the composition is 113.7 mm.

Thus, Steel A in accordance with the invention exhibits superior hardenability.

Steel A and Steel B were prepared in an identical manner. Each composition was vacuum induction melted and cast into ingots of 100 kg each, having a thickness of approx. 80 mm. The ingots were homogenized and then annealed, to soften the material. After annealing, blocks were sectioned from the ingots of Steel A and Steel B. The blocks were then hot rolled to produce plates with a thickness of approx. 20 mm. The plates were heat-treated in an identical manner, using conventional processes such as described above, comprising steps of:

normalizing;
spheroidising-annealing;
martensitic hardening;
tempering.

Test samples of Steel A and Steel B were subjected to a blunt notch impact test, to quantify toughness. Both steels exhibit good toughness, which is thought to be attributable to the carbon content, which is relatively low in comparison with conventional bearing steels.

Test samples of Steel A and Steel B were also subjected to corrosion testing, by immersing the coupons in an aqueous solution of NaCl (pH 7) for 60 minutes. Steel A exhibits superior corrosion resistance.

Steel A in accordance with the invention thus combines excellent hardenability with excellent toughness and corrosion resistance.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

What is claimed is:

1. A steel alloy comprising:
 from 0.7 to 0.9 wt. % carbon,
 from 0.1 to 0.35 wt. % silicon,
 from 0.7 to 1.2 wt. % manganese,
 from 1.0 to 2.0 wt. % chromium,
 from 0.1 to 0.35 wt. % molybdenum,
 from 0.2 to 0.6 wt. % nickel,
 from 0.6 to 1.2 wt. % copper,
 from 0.08 to 0.15 wt. % vanadium,
 from 0 to 0.15 wt. % niobium,
 from 0 to 0.15 wt. % tantalum,
 from 0 to 0.2 wt. % cobalt,
 from 0 to 0.1 wt. % aluminium,
 from 0 to 0.05 wt. % phosphorous,
 from 0 to 0.03 wt. % sulphur,
 from 0 to 0.075 wt. % tin,
 from 0 to 0.075 wt. % antimony,
 from 0 to 0.04 wt. % arsenic,
 from 0 to 0.01 wt. % lead,
 up to 350 ppm nitrogen,
 up to 100 ppm oxygen,
 up to 50 ppm calcium,
 up to 50 ppm boron,
 up to 50 ppm titanium, and
 the balance iron, together with any other unavoidable impurities.

2. The steel alloy of claim 1, comprising from 0.75 to 0.85 wt. % carbon.

3. The steel alloy of claim 1, comprising from 0.15 to 0.30 wt. % silicon.

4. The steel alloy of claim 1, comprising from 0.15 to 0.20 wt. % silicon.

5. The steel alloy of claim 4, comprising from 0.50 to 1.00 wt. % copper.

6. The steel alloy of claim 5, comprising from 0.25 to 0.50 wt. % nickel.

7. The steel alloy of claim 1, comprising copper and nickel in a ratio of 2:1.

8. The steel alloy of claim 1, comprising from 50 to 350 ppm nitrogen and up to 0.1 wt. % aluminium, wherein the weight ratio of aluminium to nitrogen in the alloy is $0.014 \leq Al/N \leq 0.6$.

9. A bearing component made from the steel alloy of claim 1.

10. A rolling-element bearing comprising an inner ring, an outer ring, and a plurality of rolling elements, wherein the rolling elements comprise the steel alloy of claim 1.

11. The steel alloy of claim 1, comprising 0.08 to 0.12 wt. % vanadium.

12. The steel alloy of claim 2, comprising
 from 0.15 to 0.3 wt. % silicon,
 from 0.7 to 1.0 wt. % manganese,
 from 1.2 to 1.8 wt. % chromium,
 from 0.15 to 0.35 wt. % molybdenum,
 0.08 to 0.12 wt. % vanadium,
 from 0.25 to 0.5 wt. % nickel, and
 from 0.6 to 1.0 wt. % copper.

* * * * *